United States Patent
Taguchi et al.

(10) Patent No.: US 9,464,742 B2
(45) Date of Patent: Oct. 11, 2016

(54) SOCKET AND PIPE FITTING INCLUDING SAME

(71) Applicant: DAISEN Co., Ltd., Ota (JP)

(72) Inventors: Hiroaki Taguchi, Ora-gun (JP); Kouechi Uchiyama, Ashikaga (JP)

(73) Assignee: DAISEN CO., LTD., Ota-shi (JP)

( * ) Notice: Subject to any disclaimer, the term of this patent is extended or adjusted under 35 U.S.C. 154(b) by 15 days.

(21) Appl. No.: 14/522,225

(22) Filed: Oct. 23, 2014

(65) Prior Publication Data

US 2015/0145244 A1 May 28, 2015

(30) Foreign Application Priority Data

Nov. 26, 2013 (JP) .................................. 2013-243684
Feb. 17, 2014 (JP) .................................. 2014-027814

(51) Int. Cl.
*F16L 37/084* (2006.01)
*F16L 37/23* (2006.01)

(52) U.S. Cl.
CPC ............ *F16L 37/0841* (2013.01); *F16L 37/23* (2013.01); *Y10S 285/924* (2013.01)

(58) Field of Classification Search
CPC . F16L 37/0841; F16L 37/23; F16L 2201/20; F16L 37/42; F16L 37/086; Y10S 285/924
USPC ............ 251/149, 149.1, 149.6, 149.8, 149.9, 251/148; 285/317, 924, 308, 316
See application file for complete search history.

(56) References Cited

U.S. PATENT DOCUMENTS

| | | | | |
|---|---|---|---|---|
| 3,817,560 | A * | 6/1974 | Guertin | F16L 37/23 285/277 |
| 3,964,771 | A * | 6/1976 | Baudouin | F16B 21/165 285/315 |
| 4,413,846 | A * | 11/1983 | Oetiker | F16L 37/086 285/308 |
| 4,483,510 | A * | 11/1984 | Palau | F16L 37/0841 137/596 |
| 4,541,457 | A * | 9/1985 | Blenkush | F16L 37/0841 137/614.05 |
| 4,753,268 | A * | 6/1988 | Palau | F16L 37/0841 137/595 |
| 5,002,254 | A * | 3/1991 | Belisaire | F16L 37/0841 251/149.8 |

(Continued)

FOREIGN PATENT DOCUMENTS

| | | |
|---|---|---|
| JP | 2000-55272 | 2/2000 |
| JP | 2005-207591 | 8/2005 |

(Continued)

*Primary Examiner* — Mary McManmon
*Assistant Examiner* — David Colon Morales
(74) *Attorney, Agent, or Firm* — Morrison & Foerster LLP (57) ABSTRACT

In a socket of the present invention, an incorporated plug part is disposed in a third base part. The socket is in an inserted state when an engaging portion of this incorporated plug part is engaged with a first engaged portion of an engaged part. In this state, an engaging portion of a plug is engaged with steel balls disposed in the incorporated plug part, thereby allowing the plug and the socket to be fitted to each other, so that an airtight condition is established in a pipe fitting.

8 Claims, 4 Drawing Sheets

(56) References Cited

U.S. PATENT DOCUMENTS

| | | | | |
|---|---|---|---|---|
| 5,535,985 A * | 7/1996 | Larbuisson | F16L 37/086 | 251/149.1 |
| 5,806,832 A * | 9/1998 | Larbuisson | F16L 37/42 | 251/149.6 |
| 6,161,578 A * | 12/2000 | Braun | F16L 37/0841 | 137/614.03 |
| 6,279,874 B1 * | 8/2001 | Nyberg | F16L 37/121 | 137/614.03 |
| 6,758,457 B2 * | 7/2004 | Nicolino | F16L 37/084 | 137/614.05 |
| 6,840,548 B2 * | 1/2005 | Lacroix | F16L 37/0841 | 251/149.6 |
| 7,472,930 B2 * | 1/2009 | Tiberghien | F16L 37/0841 | 285/308 |
| 7,887,102 B2 * | 2/2011 | Tiberghien | F16L 37/0841 | 285/1 |
| 8,256,743 B2 * | 9/2012 | Tiberghien | F16L 37/0841 | 137/614.06 |
| 2004/0094956 A1 * | 5/2004 | Lacroix | F16L 37/0841 | 285/306 |
| 2008/0252069 A1 * | 10/2008 | Tiberghien | F16L 37/0841 | 285/81 |

FOREIGN PATENT DOCUMENTS

| | | |
|---|---|---|
| JP | 2008-531947 | 8/2008 |
| WO | WO-2006/092503 | 9/2006 |

* cited by examiner

SOCKET AND PIPE FITTING INCLUDING SAME

This application claims priority from Japanese Patent Application Numbers JP 2013-243684 filed on Nov. 26, 2013, JP 2014-027814 filed on Feb. 17, 2014, the contents of which are incorporated herein by reference in its entirety.

BACKGROUND OF THE INVENTION

1. Field of the Invention

The present invention relates to a socket interposed between paths through which compressed air flows, and to a pipe fitting including the socket.

2. Description of the Related Art

Generally, an air compressor for supplying compressed air to a nail gun which is driven by compressed air is provided with a socket at its air supply port, and a plug is provided to one end portion of a hose connected to the socket at the air supply port. Moreover, a socket is provided to the other end portion of the hose, and an air tool driven by compressed air such as a nail gun is provided with a plug at a portion connected to the socket at the other end portion of the hose. By inserting and fixing the sockets to the plugs to connect each part, compressed air can be supplied into the hose through the air supply port of the air compressor. Common sockets and plugs are described for instance in Japanese Patent Application Publication No. 2000-55272.

Meanwhile, for easy detachment of a socket and a plug, a fitting has been developed which allows detachment of these two parts by using the pressure of a manual pressing-down action (this technology is described for instance in Published Japanese Translation of PCT International Application No. 2008-531947, and Japanese Patent Application Publication No. 2005-207591). Hereinbelow, a pipe fitting capable of detachment of a socket and a plug via the pressing down of a predetermined portion will be referred to as a "pressing-type pipe fitting."

Referring to FIG. 3 and [0016] of Published Japanese Translation of PCT International Application No. 2008-531947, a mechanism 18 is incorporated in a female element 7, and this mechanism 18 serves to fix a plug 5. Specifically, the plug 5 is fixed at a predetermined portion inside a housing 9 by a spring 19, a latch 20, and a driving member 21 provided to the mechanism 18. Further, by pressing down the mechanism 18, this fixed state is released, so that the fit of the plug 5 and the housing 9 is released.

Referring to FIG. 1, [0017], and [0018] of Japanese Patent Application Publication No. 2005-207591, a lock 4 is slidably incorporated in a housing part, and this lock 4 fixes a plug to a socket. Also, referring to FIG. 7 and [0033] to [0035], the plug can be pulled out when the member 42 is moved down.

However, in the case of the above socket members described in Published Japanese Translation of PCT International Application No. 2008-531947 and Japanese Patent Application Publication No. 2005-207591, the plug may not be easily fit into an inserted state in some cases.

For example, referring to FIG. 1 of Published Japanese Translation of PCT International Application No. 2008-531947, a collar 6 of the plug 5 is brought into engagement with a tooth 32 of the socket to thereby set the plug in an inserted state inside the socket. However, if the engaging side surface of the collar 6 is an inclined surface, good engagement may not be realized. The same problem occurs also to the invention described in Japanese Patent Application Publication No. 2005-207591.

SUMMARY OF THE INVENTION

The present invention has been made in view of the above problem, and an object of the present invention is to provide a pressing-type socket allowing easy attachment and detachment, and a pipe fitting including the socket.

A socket of the present invention is a socket, including: a base part having a substantially cylindrical shape; a valve body housed in the base part; an incorporated plug part housed in the base part, having a front end in an axial direction in contact with the valve body, and including an engaging portion protruding outwardly in a radial direction; an engaged part housed in a hole portion penetrating the base part outwardly in the radial direction, and including a first engaged portion on a front side in the axial direction and a second engaged portion on a rear side in the axial direction, the first engaged portion being configured to be engaged with the engaging portion of the incorporated plug part, the second engaged portion being configured to be engaged with the engaging portion of the incorporated plug part; and a plurality of steel balls housed in housing holes provided in such a way as to penetrate through a vicinity of a rear end of the incorporated plug part in the radial direction, in which in an inserted state where an airtight condition is established with a plug inserted, a front section of the plug is inserted in a rear section of the incorporated plug part, an engaging portion of the plug is engaged with the steel balls pushed out inwardly in the radial direction, and the engaging portion of the incorporated plug part is engaged with the first engaged portion of the engaged part, when the engaged part is pressed inwardly in the radial direction, the engaging portion of the incorporated plug part is disengaged from the first engaged portion, moved toward the rear side, and engaged with the second engaged portion, so that the socket shifts to a half-inserted state where a non-airtight condition is established, and when the pressing of the engaged part is released, the engagement between the engaging portion of the incorporated plug part and the second engaged portion is released, the incorporated plug part is moved toward the rear side, and the steel balls are moved outwardly in the radial direction, thereby releasing the engagement between the engaging portion of the plug and the steel balls, so that the socket shifts to a non-inserted state where the plug is capable of being pulled out.

DESCRIPTION OF THE INVENTION

Figure 1A:
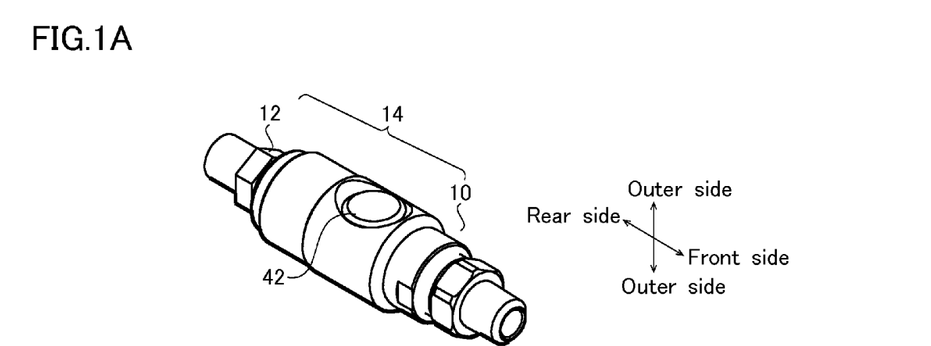
FIGS. 1A and 1B are views showing a socket and a pipe fitting of the present invention, FIG. 1A being a perspective view showing the pipe fitting, and FIG. 1B being an exploded perspective view showing the pipe fitting disassembled.
Figure 1B:
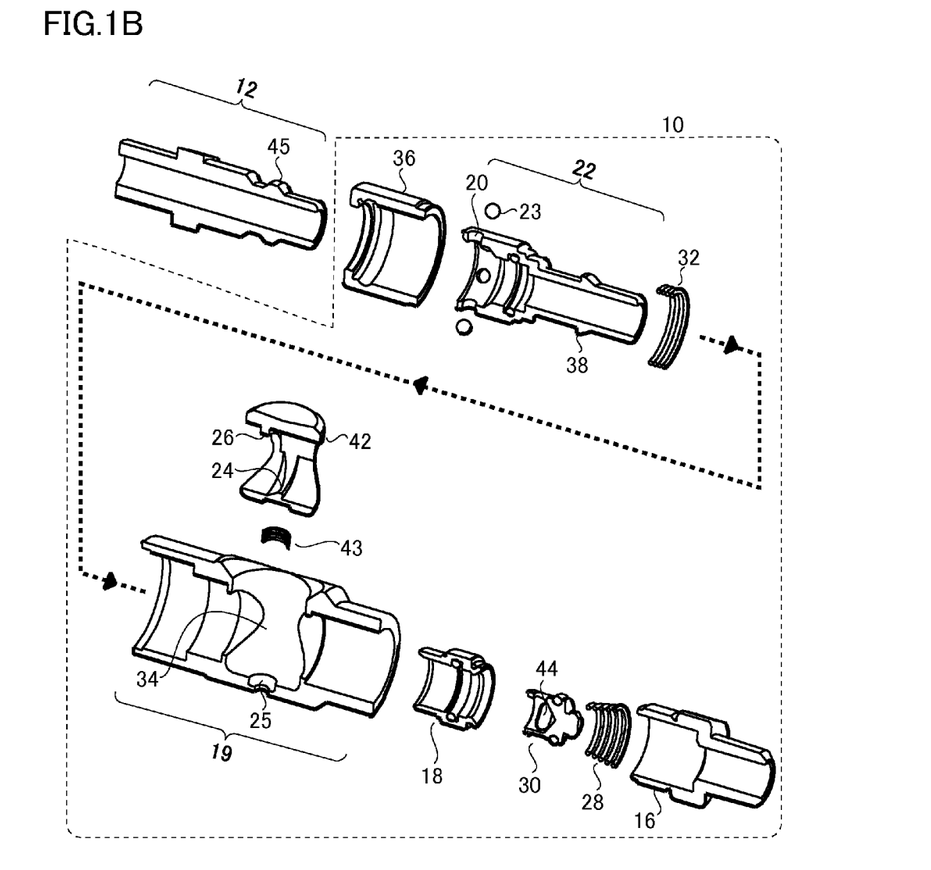

The configuration of a pipe fitting 14 according to an embodiment will be described with reference to FIGS. 1A and 1B. FIG. 1A is a perspective view showing the pipe fitting 14 in a state where a plug 12 is inserted in a socket 10. FIG. 1B is a perspective view showing the pipe fitting disassembled.

The pipe fitting 14 of this embodiment includes the socket 10 and the plug 12 configured to be inserted to the socket 10, and the pipe fitting 14 is formed by inserting the plug 12 into the socket 10. Also, the pipe fitting 14 of this embodiment is a pressing-type pipe fitting which releases the fit between the plug 12 and the socket 10 when an engaged part 42 is pressed down.

The pipe fitting 14 serves to allow attachment and detachment of a compressed-air generating device such as a compressor and a compressed-air using device such as a nail gun to and from each other by being interposed between hoses connecting them. While the pipe fitting 14 is in use, compressed air flows from the socket 10 toward the plug 12. Note that the plug 12 may be referred to as the male fitting member while the socket 10 may be referred to as the female fitting member.

In the following description, the side from which compressed air is introduced to the pipe fitting 14 will be referred to as the front side, while the opposite side will be referred to as the rear side. Moreover, the outer side in the radial direction will be referred to as the outer side, while the inner side in the radial direction will be referred to as the inner side.

The state of the pipe fitting 14 ranges from an inserted state where the plug 12 is inserted in the socket 10, thereby establishing an airtight condition, to a half-inserted state where the plug 12 is inserted in the socket 10 but a non-airtight condition is established, and to a non-inserted state where the plug 12 can be pulled out of the socket 10. FIGS. 1A and 1B are showing the inserted state where the plug 12 is inserted and fitted in the socket 10

The pipe fitting 14 is shifted from the non-inserted state to the inserted state in the following way. When the plug 12 is inserted into the socket 10, a front end portion of the plug 12 is inserted and fitted into a later-described incorporated plug part 22 incorporated in the socket 10. At the same time, a predetermined portion of the incorporated plug part 22 is engaged with the engaged part 42. Here, the inserted state refers to a state where the plug 12 is inserted in the socket 10, and their airtightness is maintained. Details of this state will be described later with reference to FIGS. 2A and 2B.

As the user presses down the engaged part 42 in the inserted state and maintains that pressed state, the pipe fitting 14 shifts to the half-inserted state. Specifically, the incorporated plug part 22 incorporated in the socket 10 is moved toward the rear side and engaged. Moreover, in this state, the incorporated plug part 22 and the plug 12 still remain fitted to each other. Here, the half-inserted state refers to a state where the plug 12 is inserted and fitted in the socket 10 but their airtightness is not maintained. Details of this state will be described later with reference to FIGS. 3A to 3C.

When the user then releases the pressing of the engaged part 42, the pipe fitting 14 shifts to the non-inserted state. Specifically, the engagement between the incorporated plug part 22 incorporated in the socket 10 and the engaged part 42 is released, and the fit between the incorporated plug part 22 and the plug 12 is released. Here, the non-inserted state refers to a state where the plug 12 can be pulled out of the socket 10 and their airtightness is not maintained. Details of this state will be described later with reference to FIGS. 4A and 4B.

Referring to FIG. 1B, the socket 10 includes a base part which houses the incorporated plug part 22 and other members by combining a first base part 16, a second base part 18, a third base part 19, and a fourth base part 36 in this order from the front side. A valve body 30 and a spring 28 are housed inside the first base part 16 and the second base part 18.

The engaged part 42 configured to determine the position of the incorporated plug part 22 is housed in a hole portion 34 upwardly penetrating the third base part 19. A first engaged portion 24 and a second engaged portion 26 are disposed on the inner surface of the engaged part 42, and these portions are each configured to be engaged with an engaging portion 38 of the incorporated plug part. A spring 43 is housed in a recessed portion 25 provided at the bottom of the hole portion 34. This spring 43 is configured to apply a biasing force upwardly to the engaged part 42.

A spring 32 and the incorporated plug part 22 are incorporated in this order from the front side in the rear side of the third base part 19 from the hole portion 34 and the fourth base part 36. The spring 32 is configured to apply a biasing force to the incorporated plug part 22 toward the rear side.

During the above-described inserted state and half-inserted state, the incorporated plug part 22 serves to determine the positions of the plug 12 and the socket 10 relative to each other, by being engaged with one of the engaged portions of the engaged part 42. Housing holes 20 are formed in the incorporated plug part 22 in the vicinity of the rear end thereof and are provided in a circular shape, penetrating that portion in the thickness direction. A steel ball 23 is housed in each of these housing holes 20. The steel ball 23 serves to allow the plug 12 and the incorporated plug part 22 to be fitted to each other.

The plug 12 includes an engaging portion 45 obtained by expanding the diameter of the vicinity of the front end thereof. When the plug 12 is inserted in the socket 10, this engaging portion 45 is fitted to the incorporated plug part 22 with the steel balls 23. In this embodiment, both side surfaces of the engaging portion 45 of the plug 12 define a fan-shape spreading wider toward the inner side in the radial direction.

Meanwhile, an O-ring obtained by molding a soft resin material into a ring shape is interposed between contacting portions of members forming the pipe fitting 14.

Figure 2A:
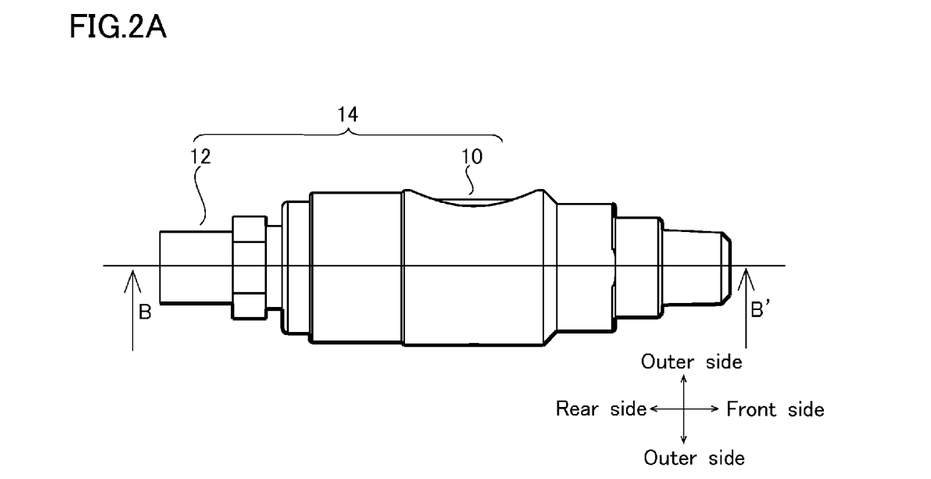
FIGS. 2A and 2B are views showing the socket and the pipe fitting of the present invention, FIG. 2A being a plan view showing the pipe fitting in an inserted state, and FIG. 2B being a cross-sectional view thereof.
Figure 2B:
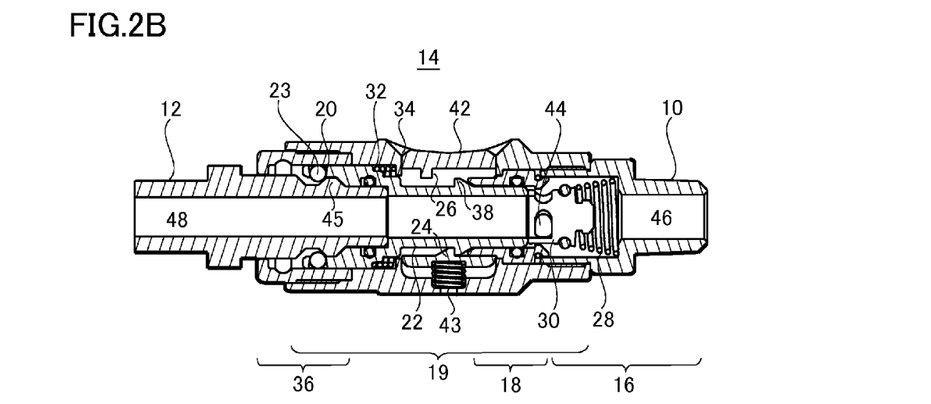

The configuration of the pipe fitting 14 in the inserted state will be described with reference to FIGS. 2A and 2B. FIG. 2A is a plan view showing the pipe fitting 14 in the state where the plug 12 is inserted in the socket 10. FIG. 2B is a cross-sectional view of the pipe fitting 14 shown in FIG. 2A, taken along line B-B'.

The configuration associated with the base parts will be described with reference to FIG. 2B. The vicinity of the rear end of the first base part 16, which is disposed on the front side, is inserted in and fixed to the third base part 19. This insertion and fixing are realized by fastening utilizing a screw structure, bonding with adhesive, or a combination of both. The same applies to other members forming the socket 10. The second base part 18 is incorporated in a front section of the third base part 19, and a front end portion thereof is in contact with the first base part 16. The inner diameter of the second base part 18 is substantially equal to the outer diameter of a front section of the incorporated plug part 22. The fourth base part 36 is incorporated in a rear section of the third base part 19, and the inner diameter thereof is substantially equal to the outer diameter of a rear section of the incorporated plug part 22. These base parts are each made of a metallic material.

The spring 28 and the valve body 30 are incorporated in the first base part 16. A front end portion of the spring 28 is in contact with a wall portion of the first base part 16 provided on the inner side thereof, while a rear end portion of the spring 28 is in contact with the valve body 30. While the pipe fitting 14 is in use, the spring 28 applies a biasing force to the valve body 30 toward the rear side. The valve body 30 has a bottomed-cylindrical shape with an opening on the rear end side, and is disposed in such a way that the outer surface thereof can be in contact with the inner surface of the second base part 18. In the inserted state shown in FIG. 2B, the valve body 30 is pushed toward the front side by the incorporated plug part 22 such that a hole portion 44 of the valve body 30 is not closed by the second base part 18 but exposed therefrom. There are provided multiple hole portions 44 penetrating through the sidewall of the valve body 30 at an equal interval in the circumferential direction. An air flow path 46 on the socket 10 side and an air flow path 48 on the plug 12 side communicate with each other through these hole portions 44.

The incorporated plug part 22 is incorporated in the third base part 19. The incorporated plug part 22 is a member which serves to be fitted to the plug 12 and engaged with the engaged part 42 while the pipe fitting 14 is in use. In other words, the incorporated plug part 22 is a member which is interposed between the plug 12 and the engaged part 42 to link them. The shape of the incorporated plug part 22 is specifically a substantially cylindrical shape with a greater diameter at a rear end portion than at a front end portion, and includes the engaging portion 38 obtained by annularly expanding a peripheral portion. The front side surface of the engaging portion 38 is an inclined surface, while the rear side surface is a surface perpendicular to the axial direction.

The housing holes 20 are formed through the rear end portion of the incorporated plug part 22, and the steel balls 23 are housed in these housing holes 20. In the inserted state, the steel balls 23 are in contact with the inner wall of the fourth base part 36, thereby being pushed out inwardly and engaged with the rear side surface of the engaging portion 45 of the plug 12. Accordingly, the incorporated plug part 22 and the plug 12 are fitted to each other.

Now, the engagement between the engaged part 42 and the incorporated plug part 22 will be described. The engaged part 42 is housed in the hole portion 34 provided in the third base part 19 in a circular shape upwardly penetrating therethrough, and its outer shape is cylindrical. Moreover, the engaged part 42 is provided with a through-hole in the axial direction, and the incorporated plug part 22 is disposed in this through-hole. The first engaged portion 24 is formed on the lower surface of the inner wall of the engaged part 42, while the second engaged portion 26 is formed on the upper surface of the inner wall. The first engaged portion 24 is formed on the front side, while the second engaged portion 26 is provided on the rear side.

The first engaged portion 24 is a portion protruding upwardly from the inner surface of the engaged part 42. The front side surface of the first engaged portion 24 is a surface perpendicular to the axial direction. While the pipe fitting 14 is in use, the rear side surface of the engaging portion 38 of the incorporated plug part 22 is in contact with this front side surface. Here, with the engaged part 42 biased upwardly by the spring 43, the first engaged portion 24 is engaged with the engaging portion 38 of the incorporated plug part 22. As a result, the position of the incorporated plug part 22 inside the socket 10 is determined. In this state, on the other hand, the second engaged portion 26 of the engaged part 42 is out of contact with the incorporated plug part 22.

The pipe fitting 14 of this embodiment is used in the above-described inserted state. Specifically, compressed air generated by the compressed-air generating device disposed outside is introduced into the pipe fitting 14 from the front side and supplied into the compressed-air using device such as a nail gun through the air flow path 46, the hole portions 44 of the valve body 30, and the air flow path 48.

Figure 3A:
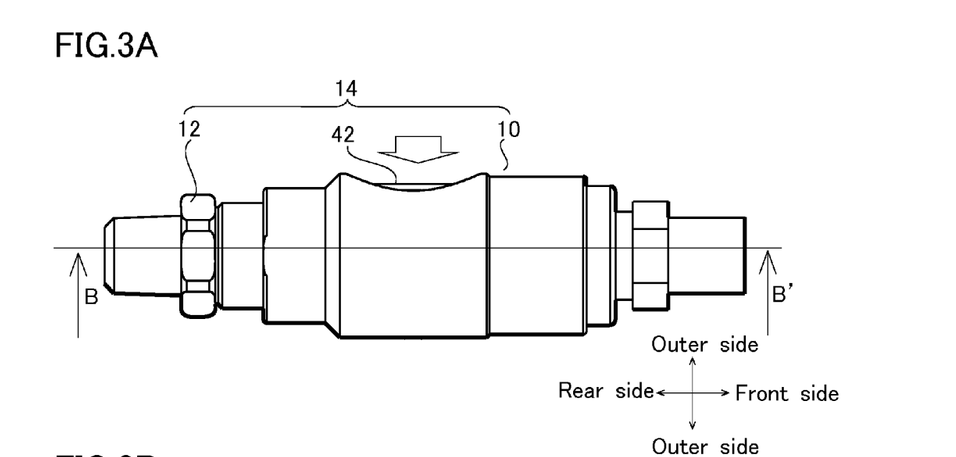
FIGS. 3A to 3C are views showing the socket and the pipe fitting of the present invention, FIG. 3A being a plan view showing the pipe fitting in a half-inserted state, FIG. 3B being a cross-sectional view thereof, and FIG. 3C being a cross-sectional view showing biasing forces applied by springs.
Figure 3B:
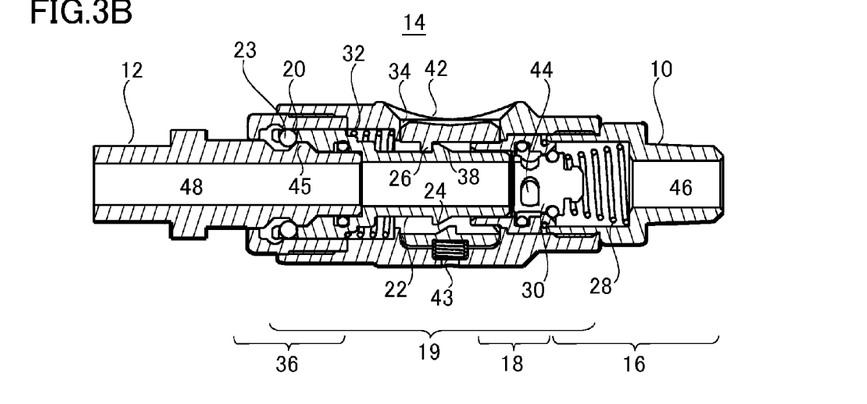

The configuration of the pipe fitting 14 in the half-inserted state will be described with reference to FIGS. 3A to 3C. FIG. 3A is a plan view showing the pipe fitting 14 in this state. FIG. 3B is a cross-sectional view taken along line B-B' in FIG. 3A.

Referring to FIG. 3A, the engaged part 42 of the socket in the above-described inserted state is pressed down, and this pressed state is maintained. As a result, the plug 12 is pushed toward the rear side by several millimeters from the socket 10 and held at that position. This state is the half-inserted state (purged state) in which the fit between the plug 12 and the socket 10 is maintained but their airtightness is released.

The configuration of the pipe fitting 14 in the half-inserted state will be described in detail with reference to FIG. 3B. As the user presses down the engaged part 42, the spring 43 is compressed and the engaged part 42 is moved downwardly. With this movement, the engaging portion 38 of the incorporated plug part 22 is detached from the first engaged portion 24. As a result, the incorporated plug part 22 moves toward the rear side with the biasing forces of the spring 28 and the spring 32. Thereafter, the front side surface of the second engaged portion 26 of the engaged part 42 comes into engagement with the rear side surface of the engaging portion 38 of the incorporated plug part 22. Thus, the position of the incorporated plug part 22 inside the socket 10 in the half-inserted state is fixed.

With the movement of the incorporated plug part 22, the valve body 30 biased toward the rear side by the spring 28 moves toward the rear side as well, so that the inner wall of the second base part 18 closes the hole portions 44 of the valve body 30. As a result, the air flow path 46 and the air flow path 48 are separated from each other inside the socket 10. Thus, even if the airtightness in the rear side from the second base part 18 is released, compressed air supplied from the compressor connected to the socket 10 will not leak out.

Further, the plug 12 also moves toward the rear side. In this movement, the steel balls 23 are maintained in the state where they are in contact with the inner wall of the fourth base part 36 and pushed out inwardly. Thus, the engaging portion 45 of the plug 12 remains engaged with the steel balls 23. Accordingly, even in the half-inserted state, the plug 12 and the incorporated plug part 22 remain fitted to each other, and the plug 12 will not be detached from the socket 10 in this state by the internal pressure.

Figure 3C:
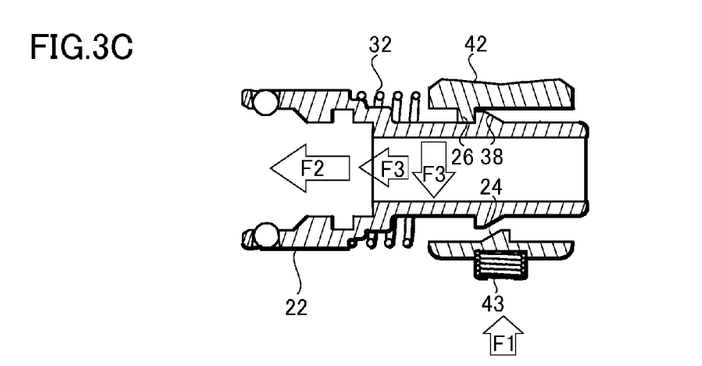

Referring to FIG. 3C, in this embodiment, the biasing force of the spring 43 and the biasing force of the spring 32 are set to have a predetermined relation with each other. In this way, even when the pressing force applied by the user to the engaged part 42 is released in the middle of the purging operation, the engagement of the engaging portion 38 of the incorporated plug part 22 with the second engaged portion 26 of the engaged part 42 can be maintained.

Specifically, if a force F1 with which the spring 43 biases the engaged part 42 toward the upper side as viewed in the drawings is large, the engaged part 42 will move toward the upper side as viewed in the drawings when the pressing force applied by the user to the engaged part 42 is released. As a result, the engagement between the second engaged portion 26 of the engaged part 42 and the engaging portion 38 of the incorporated plug part 22 will be released, thereby possibly causing detachment of the plug 12 from the socket 10 in the middle of the purging.

In this embodiment, however, the biasing force F1 which the spring 43 applies to the engaged part 42 is set at a small degree, while a biasing force F2 which the spring 32 applies to the incorporated plug part 22 toward the left side as viewed in the drawings is set at a large degree. In one example, the spring 43 is given a wire diameter of 0.6 mm, a number of windings of 6, a free length of 7 mm, and an outer diameter of 6 mm, and the free length is set shorter than usual ones. Moreover, the spring 32 is given a wire diameter of 1.1 mm, a number of windings of 3.5, a free length of 20 mm, and an outer diameter of 15 mm.

In this way, even if the pressing force applied by the user to the engaged part 42 is released in the middle of the purging operation, the engagement between the engaging portion 38 of the incorporated plug part 22 and the second engaged portion 26 of the engaged part 42 will be maintained while air filled in a pipe downstream of the plug 12 is discharged to the outside through the pipe fitting 14. The plug 12 is prevented from being pulled out by the air pressure in the middle of the purging operation.

This is because the frictional force generated by the engaging portion 38 pressed against the second engaged portion 26 by the biasing force of the spring 32 works as a resistance against the biasing force F1 applied by the spring 43. Further, a pressure F3 generated by the air discharged to the outside during the purging operation also works as a resistance against the biasing force F1 applied by the spring 43. Here, as shown in FIG. 3C, the direction in which the pressure F3 is applied may be toward the left side as viewed in the drawing, toward the lower side as viewed in the drawing, or these two directions. Once the air inside the pipe is finished being discharged to the outside in the purging operation, there is no longer the pressure F3 obtained from the air, so that the engaged part 42 moves upwardly with the biasing force F1 of the spring 43, thereby releasing the engagement between the engaging portion 38 and the second engaged portion 26. In other words, the plug 12 is detached from the socket 10.

Figure 4A:
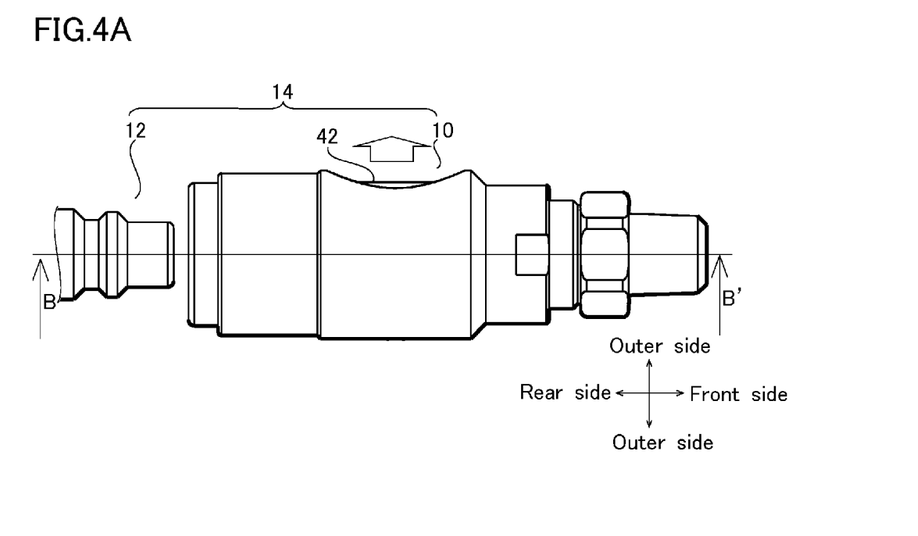
FIGS. 4A and 4B are views showing the socket and the pipe fitting of the present invention, FIG. 4A being a plan view showing the pipe fitting in a non-inserted state, and FIG. 4B being a cross-sectional view thereof.
Figure 4B:
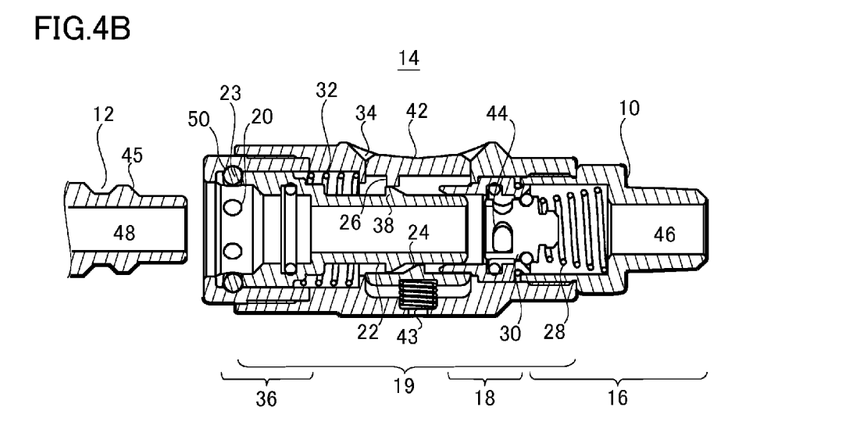

Next, a disconnected state in which the plug 12 is pulled out of the socket 10 will be described with reference to FIGS. 4A and 4B. FIG. 4A is a plan view showing the pipe fitting 14 in the disconnected state. FIG. 4B is a cross-sectional view taken along line B-B' in FIG. 4A.

Referring to FIG. 4A, after the pipe fitting 14 shifts to the above-described half-inserted state, the pressing force applied to the engaged part 42 is released. As a result, the fit between the plug 12 and the socket 10 is released and the plug 12 is detached.

Specifically, referring to FIG. 4B, when the pressing force applied to the engaged part 42 is released, the engaged part 42 moves upwardly with the biasing force of the spring 43. As a result, the engagement between the engaging portion 38 of the incorporated plug part 22 and the second engaged portion 26 is released. Thereafter, the incorporated plug part 22 moves toward the rear side with the biasing force of the spring 32. After the movement, the upper surface (outer end portion) of the engaging portion 38 of the incorporated plug part 22 is in contact with the lower surface (inner end portion) of the second engaged portion 26 of the engaged part 42.

With the movement of the incorporated plug part 22, the steel balls 23 housed in the housing holes 20 enter a recessed portion 50 of the fourth base part 36. As a result, the steel balls 23 move outwardly in the radial direction, so that the engagement between the engaging portion 45 of the plug and the steel balls 23 is released. Thus, the plug 12 can now be pulled out of the socket 10. Moreover, since the steel balls 23 enter and come into engagement with the recessed portion 50, the movement of the incorporated plug part 22 toward the rear side stops.

The above are the structures and the operations of the pipe fitting 14 in the inserted, half-inserted, and non-inserted states.

A characteristic feature of the present invention is that the incorporated plug part 22 configured to be engaged with the inside of the socket 10 instead of the plug is provided. Specifically, referring to FIGS. 2A and 2B, the inserted state is realized by engaging the engaging portion 38 of the incorporated plug part 22 with the first engaged portion 24 of the engaged part 42. Moreover, referring to FIGS. 3A to 3C, the half-inserted state is realized by engaging the engaging portion 38 of the incorporated plug part 22 with the second engaged portion 26 of the engaged part 42. In addition, the incorporated plug part 22 and the plug 12 are fitted to each other with the engagement structure using the steel balls 23. In this way, even if, for example, the plug 12 to be used has a shape which is difficult to be fitted to the engaged part 42, the pressing-type pipe fitting 14 can employ that plug 12.

Referring to FIGS. 2A and 2B, another characteristic feature of the present invention is that the engaging side surface of the engaging portion 38 provided to the incorporated plug part 22 (the side surface facing the rear side) is perpendicular to the axial direction. In this way, this side surface can well be in contact with the side surfaces of the first engaged portion 24 and the second engaged portion 26 provided on the inner surface of the engaged part 42. Thus, the side surface can be engaged reliably with these portions.

Further, in the present invention, the incorporated plug part 22 incorporated in the socket 10 and the plug 12 are fitted to each other by using the steel balls 23. In this way, the plug 12 and the incorporated plug part 22 can well be fitted to each other even when the engaging portion 45 provided to the plug 12 protrudes in a fan-shape.

This embodiment described above can be modified as follows, for example.

Referring to FIGS. 2A and 2B, the angle of the engaging side surface of the engaging portion 38 provided to the incorporated plug part 22 with respect to the axial direction is a right angle. However, this angle may be an angle other than a right angle. Specifically, the angle may be an angle closer to a right angle than is the angle of the engaging surface of the plug 12 with respect to the axial direction.

According to the present invention, the incorporated plug part including the engaging portion configured to be engaged with the engaged part is incorporated in the base part, and the plug is inserted in this incorporated plug part and used while the pipe fitting is in use. In this way, in the pressing-type socket, the incorporated plug part serves to be engaged with the engaged part. Thus, the plug and the incorporated plug part can be engaged with each other with the engagement structure using the steel balls. Accordingly, even when the engaging portion of the plug to be used is not suitable for the pressing-type socket, the plug can be inserted into the pressing-type socket and used.

What is claimed is:

1. A socket, comprising:
a base part having a cylindrical shape;
a valve body housed in the base part;
an incorporated plug part housed in the base part, having a front end in an axial direction in contact with the valve body, and including an engaging portion protruding outwardly in a radial direction;
an engaged part housed in a hole portion penetrating the base part outwardly in the radial direction, and including a first engaged portion on a front side in the axial direction and a second engaged portion on a rear side in the axial direction, the first engaged portion being configured to be engaged with the engaging portion of the incorporated plug part, the second engaged portion being configured to be engaged with the engaging portion of the incorporated plug part; and
a plurality of steel balls housed in housing holes that penetrate through a vicinity of a rear end of the incorporated plug part in the radial direction,
wherein in an inserted state where an airtight condition is established with a plug inserted, a front section of the plug is inserted in a rear section of the incorporated plug part, an engaging portion of the plug is engaged with the steel balls pushed out inwardly in the radial direction, and the engaging portion of the incorporated plug part is engaged with the first engaged portion of the engaged part,
when the engaged part is pressed inwardly in the radial direction, the engaging portion of the incorporated plug part is disengaged from the first engaged portion, moved toward the rear side, and engaged with the second engaged portion, so that the socket shifts to a half-inserted state where a non-airtight condition is established, and
when the pressing of the engaged part is released, the engagement between the engaging portion of the incorporated plug part and the second engaged portion is released, the incorporated plug part is moved toward the rear side, and the steel balls are moved outwardly in the radial direction, thereby releasing the engagement between the engaging portion of the plug and the steel balls, so that the socket shifts to a non-inserted state where the plug is capable of being pulled out, and wherein the base part comprises an outer part and an inner part that is separate from the outer part and housed completely inside the outer part, and a portion of the inner part of the base part, which is rigidly connected to the remainder of the base part, is placed inside the engaged part so as to be at a same position with respect to the axial direction in the inserted state, the half-inserted state and the non-inserted state, and
the portion of the inner part placed inside the engaged part is in contact with both the engaged part and the incorporated plug part.

2. The socket according to claim 1, wherein in the half-inserted state, the steel balls are engaged with the engaging portion of the plug.

3. The socket according to claim 1, wherein an angle of an engaging surface of the engaging portion of the incorporated plug part with respect to the axial direction is closer to a right angle than is an angle of an engaging surface of the engaging portion of the plug with respect to the axial direction.

4. The socket according to claim 1, further comprising:
a first spring configured to bias the engaged part in the radial direction; and
a second spring configured to bias the incorporated plug part toward the plug, wherein
biasing forces of the first spring and the second spring are set at such degrees that while air inside a pipe connected to the plug is being discharged to an outside in the half-inserted state, the engagement between the engaging portion of the incorporated plug part and the second engaged portion of the engaged part is not released even when the pressing of the engaged part is released.

5. A pipe fitting, comprising:
the socket according to claim 1; and
the plug inserted in the socket.

6. The socket according to claim 1, wherein the portion of the base part rigidly connected to the remainder of the base part is in contact with the incorporated plug part in the inserted state, the half-inserted state and the non-inserted state.

7. The socket according to claim 1, further comprising a spring pushing the valve body toward the rear side.

8. The socket according to claim 1, wherein the engaged part has a cylindrical outer shape.

* * * * *